(12) United States Patent
Tayal et al.

(10) Patent No.: US 11,016,979 B2
(45) Date of Patent: May 25, 2021

(54) SYSTEMS AND METHOD FOR DOMAIN SEPARATION OF SERVICE CATALOG

(71) Applicant: ServiceNow, Inc., Santa Clara, CA (US)

(72) Inventors: Varun Tayal, Hyderabad (IN); James Robert Edmonds, Franklin, TN (US); Jeremy Hess, Fairfield, OH (US); Navakanth Reddy Gandavarapu, San Jose, CA (US); Shouvik Goswami, Hyderabad (IN); Bharath Padaki, San Diego, CA (US); Jebakumar Mathuram Santhosm Swvigaradoss, Hyderabad (IN); Harshvardhan Prasad, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/532,157

(22) Filed: Aug. 5, 2019

(65) Prior Publication Data

US 2021/0042316 A1    Feb. 11, 2021

(51) Int. Cl.
*G06F 3/048* (2013.01)
*G06F 16/2457* (2019.01)
*G06F 16/242* (2019.01)
*G06F 16/248* (2019.01)
*G06F 16/2458* (2019.01)

(52) U.S. Cl.
CPC ...... *G06F 16/24573* (2019.01); *G06F 16/248* (2019.01); *G06F 16/2428* (2019.01); *G06F 16/2458* (2019.01)

(58) Field of Classification Search
None
See application file for complete search history.

(56) References Cited

U.S. PATENT DOCUMENTS

| | | |
|---|---|---|
| 6,321,229 B1 | 11/2001 | Goldman et al. |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,155,715 B1 * | 12/2006 | Cui .......................... G06F 8/75 717/177 |

(Continued)

OTHER PUBLICATIONS

U.S. Appl. No. 16/242,820, filed Jan. 8, 2019, Harshvardhan Prasad.

*Primary Examiner* — Hua Lu
(74) *Attorney, Agent, or Firm* — Fletcher Yoder PC

(57) ABSTRACT

A domain separated service catalog may include global catalog items and domain-specific catalog items. Global catalog items may be accessible to all users of a catalog. Catalog item data for global catalog items may be stored in a catalog item data table. Domain separated catalog items may only be accessible within the domain with which they are associated. Catalog item data for domain separated catalog items may also be stored in the catalog item data table. When a user associated with a domain opens the service catalog, data for catalog items may be retrieved from the catalog item data table. The catalog may then be populated with the global catalog items and the domain specific catalog items.

20 Claims, 10 Drawing Sheets

(56) References Cited

U.S. PATENT DOCUMENTS

| | | |
|---|---|---|
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Solovinsky |
| 7,769,718 B2 | 8/2010 | Murley |
| 7,783,744 B2 | 8/2010 | Garg |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,346,929 B1* | 1/2013 | Lai ............... H04L 63/20 |
| | | 709/226 |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,806,061 B1* | 8/2014 | Lobo ............... G06F 9/5061 |
| | | 709/246 |
| 8,832,652 B2 | 9/2014 | Mueller et al. |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Jvhitney |
| 9,239,857 B2 | 1/2016 | Trinon |
| 9,286,391 B1* | 3/2016 | Dykstra ............ G06F 16/9024 |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,095,800 B1* | 10/2018 | Yalamanchi ......... G06F 16/217 |
| 10,541,938 B1* | 1/2020 | Timmerman ........ H04L 43/065 |
| 10,579,932 B1* | 3/2020 | Cantrell ............. G06F 17/18 |
| 2002/0087670 A1* | 7/2002 | Epstein ............... H04L 41/5041 |
| | | 709/223 |
| 2003/0074206 A1* | 4/2003 | Hoffman ............. G06Q 50/188 |
| | | 705/80 |
| 2003/0182234 A1* | 9/2003 | Degroot ............. H04L 67/306 |
| | | 705/51 |
| 2003/0229549 A1* | 12/2003 | Wolinsky ........... G06Q 30/0248 |
| | | 705/14.61 |
| 2004/0193482 A1* | 9/2004 | Hoffman ............ G06Q 30/0273 |
| | | 705/14.69 |
| 2006/0041496 A1* | 2/2006 | Amin ................. G06Q 30/02 |
| | | 705/301 |
| 2008/0216082 A1* | 9/2008 | Eilam ................. G06F 9/5072 |
| | | 718/104 |
| 2009/0006351 A1* | 1/2009 | Stephenson ......... G06F 16/958 |
| 2010/0299268 A1* | 11/2010 | Guha ................ G06Q 30/0205 |
| | | 705/80 |
| 2011/0093361 A1* | 4/2011 | Morales ............ G06Q 30/0603 |
| | | 705/26.62 |
| 2013/0132854 A1* | 5/2013 | Raleigh .................. H04W 4/60 |
| | | 715/738 |
| 2013/0278492 A1* | 10/2013 | Stolarz ..................... G06F 3/01 |
| | | 345/156 |
| 2014/0040224 A1* | 2/2014 | Grant ................ G06Q 30/0256 |
| | | 707/706 |
| 2014/0280595 A1* | 9/2014 | Mani ...................... H04L 67/10 |
| | | 709/204 |
| 2015/0206207 A1* | 7/2015 | Narasimhan ....... G06Q 30/0283 |
| | | 705/400 |
| 2016/0110723 A1* | 4/2016 | Shimpi ............... G06Q 30/016 |
| | | 705/304 |
| 2016/0134616 A1* | 5/2016 | Koushik .................. H04L 63/08 |
| | | 726/9 |
| 2016/0352924 A1* | 12/2016 | Senarath ............ H04M 15/8033 |
| 2017/0201850 A1* | 7/2017 | Raleigh ................ G06F 3/0482 |
| 2017/0237682 A1* | 8/2017 | Xue ..................... G06F 9/5038 |
| | | 709/226 |
| 2017/0324707 A1* | 11/2017 | Krinos ................. H04L 45/50 |
| 2018/0322027 A1 | 11/2018 | Padaki et al. |
| 2019/0042988 A1* | 2/2019 | Brown .............. G06Q 10/0631 |
| 2019/0097838 A1* | 3/2019 | Sahoo ................ H04L 45/745 |
| 2019/0102817 A1 | 4/2019 | Padaki et al. |
| 2019/0110207 A1* | 4/2019 | Makhijani ............... H04W 8/08 |
| 2019/0190746 A1* | 6/2019 | Lee .................... H04L 41/0893 |
| 2019/0363995 A1* | 11/2019 | Florissi ................ G06F 16/182 |
| 2019/0392051 A1* | 12/2019 | Damyanov ......... G06F 16/1873 |
| 2020/0092696 A1* | 3/2020 | Ly ............................ H04L 67/16 |
| 2020/0195500 A1* | 6/2020 | Kishen ................ G06F 9/45558 |

* cited by examiner

SYSTEMS AND METHOD FOR DOMAIN SEPARATION OF SERVICE CATALOG

BACKGROUND

The present disclosure relates generally to online service catalogs, and more specifically to implementing domain separation of service catalogs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A managed service provider (MSP) may purchase or lease cloud computing and/or storage resources from a cloud service provider and then sublease the cloud resources to multiple customers. The cloud resources may be utilized to implement a service catalog. If a service catalog for multiple customers operates on a single instance, then all of the catalog items may be accessible by the multiple customers. Accordingly, it may be desirable to implement a service catalog such that some catalog items that are unique to a specific customer are only accessible by that customer.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a domain separated service catalog. Specifically, catalog items may be defined by catalog item data stored in one or more catalog item data tables. Global catalog items may be accessible to all users of a catalog. Accordingly, catalog item data for global catalog items may be stored in one or more catalog item data tables. Correspondingly, domain separated catalog items may only be accessible within the domain with which they are associated. Catalog item data for domain separated catalog items may be stored in one or more catalog item data tables, which may be the same or different from the tables in which the global catalog item data is stored. When a user associated with a domain opens the service catalog, data for catalog items may be retrieved from the one or more tables. The catalog may then be populated with the global catalog items and the domain specific catalog items. A user may then navigate the service catalog, add items/services to a cart, and order items/services. Further, a user may provide inputs defining new catalog items to associate with a domain, or associating an existing catalog item with a different domain.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
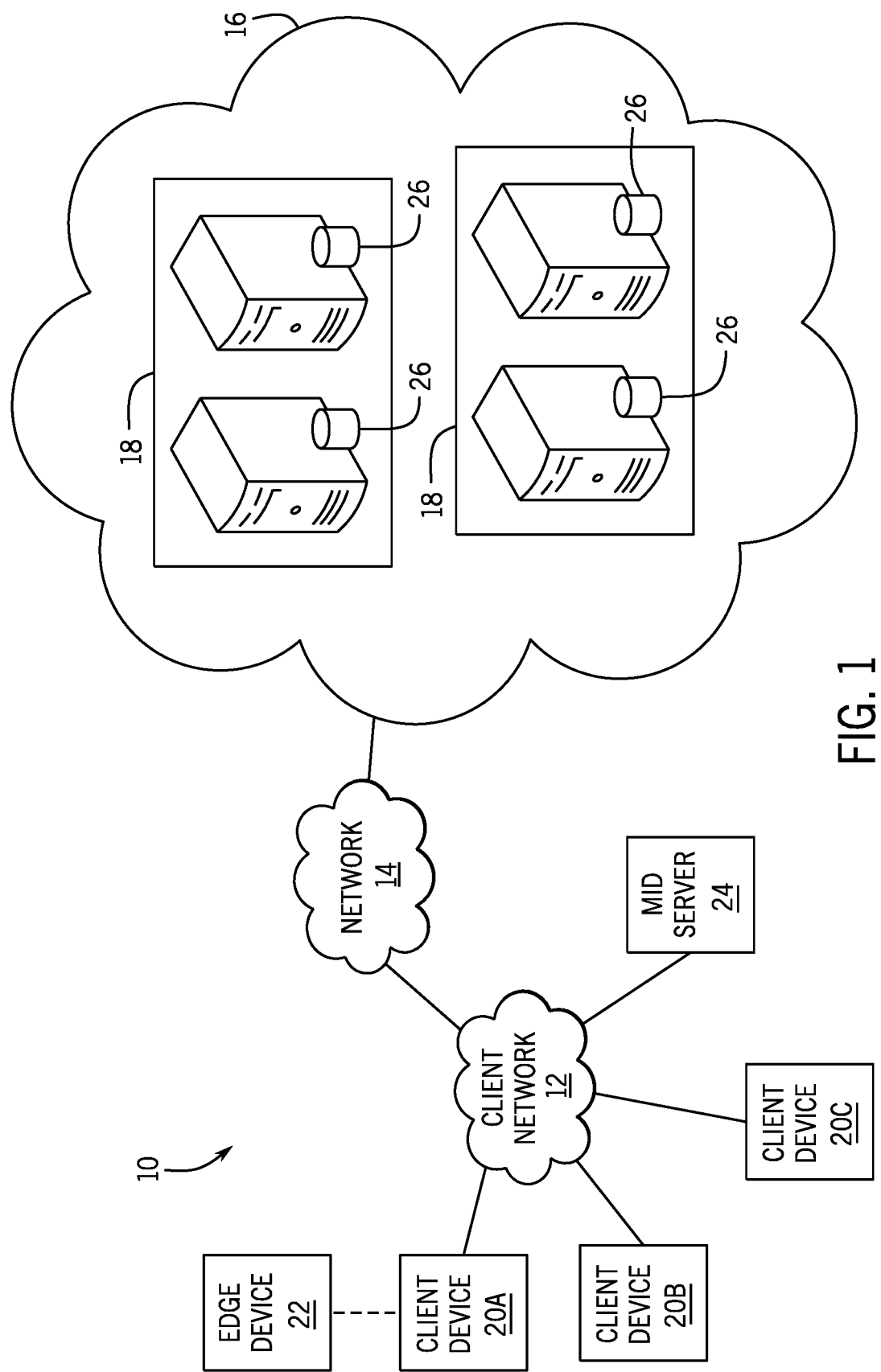
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A managed service provider (MSP) may purchase or lease cloud computing and/or storage resources from a cloud service provider and then sublease the cloud resources to multiple customers. In some circumstances the cloud resources may be utilized to implement a service catalog, by which users may order products or services. If a service catalog for multiple customers operates on a single instance, then all of the catalog items within the service catalog may be accessible by all of the users of the multiple customers. A domain separated service catalog allows for global catalog items to be accessible by all users and domain specific catalog items to only be accessible by users associated with the identified domain, such that some catalog items that are unique to a specific customer are only accessible by that customer. Catalog items may be defined by catalog item data stored in one or more catalog item data tables. In the instant embodiment, catalog item data for all catalog items may be stored in a single catalog item data table. The catalog item data table may include a field for domain. For global catalog items, the domain field for that particular item may reflect that the catalog item is in the global domain. Correspondingly, for catalog items specific to a given domain, the domain field may list the specific domain. Alternatively, for embodiments in which catalog item data for global catalog items and domain-specific catalog items are stored in different tables, or embodiments in which catalog item data for catalog items in different domains are stored in different tables, global catalog items may be defined by catalog item data for global catalog items may be stored in one or more global catalog item data tables and accessible to all users of a catalog. Correspondingly, domain separated catalog items may be defined by catalog item data stored in one or more domain specific catalog item data tables, and only be accessible within the domain with which they are associated. When a user associated with a domain opens the service catalog, data for catalog items may be retrieved and the catalog may be populated with the global catalog items and the domain specific catalog items. A user may then navigate the service catalog, add items/services to a cart, and order items/services.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
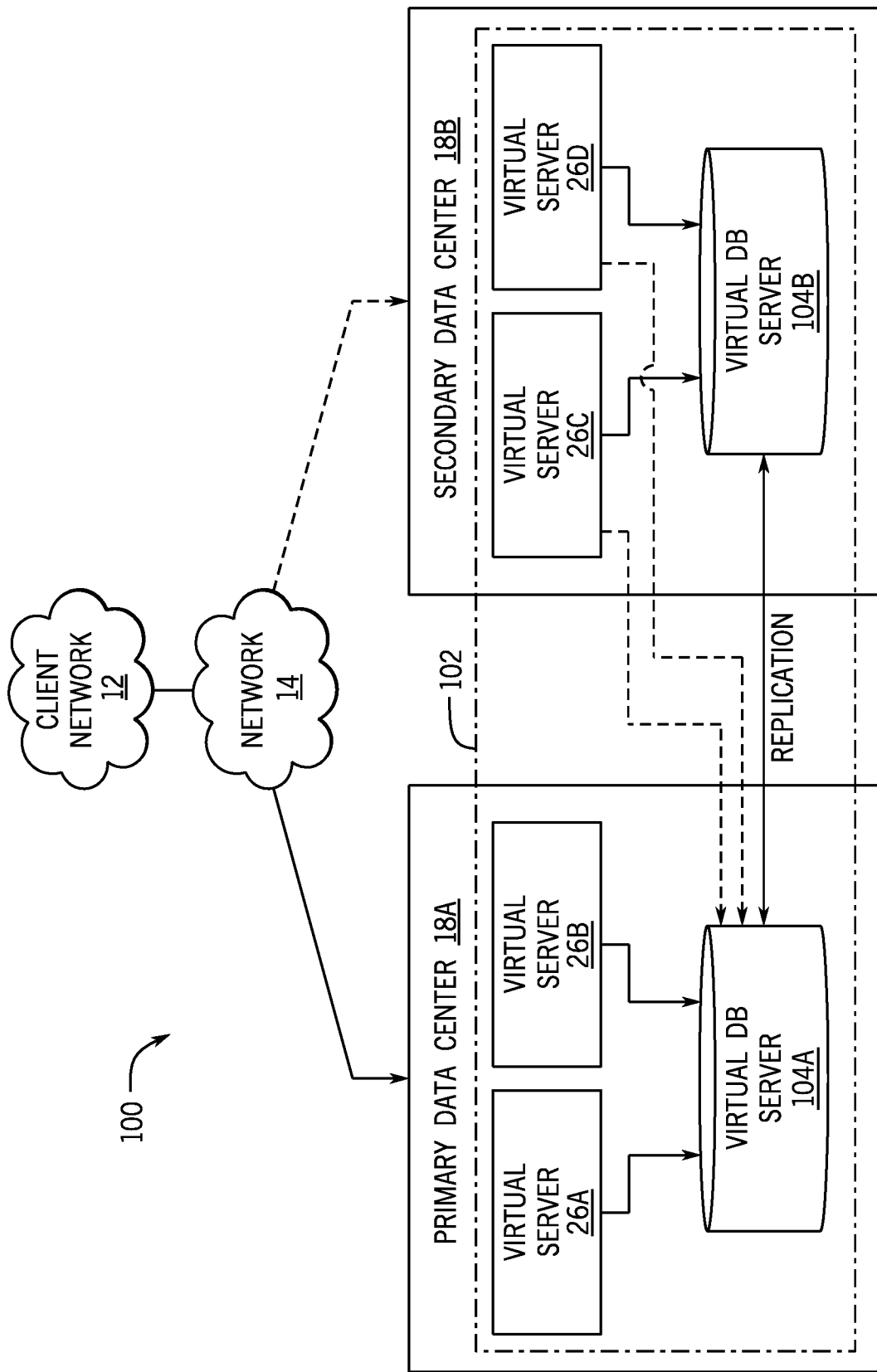
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B (such as for data redundancy and/or failover purposes) that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
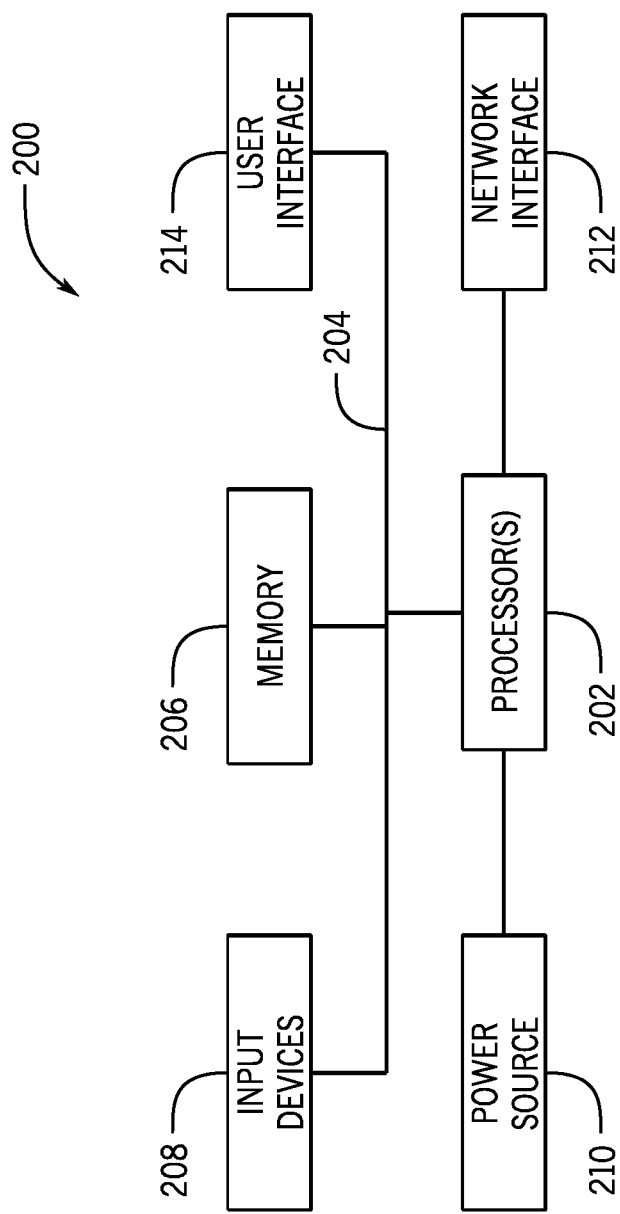
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
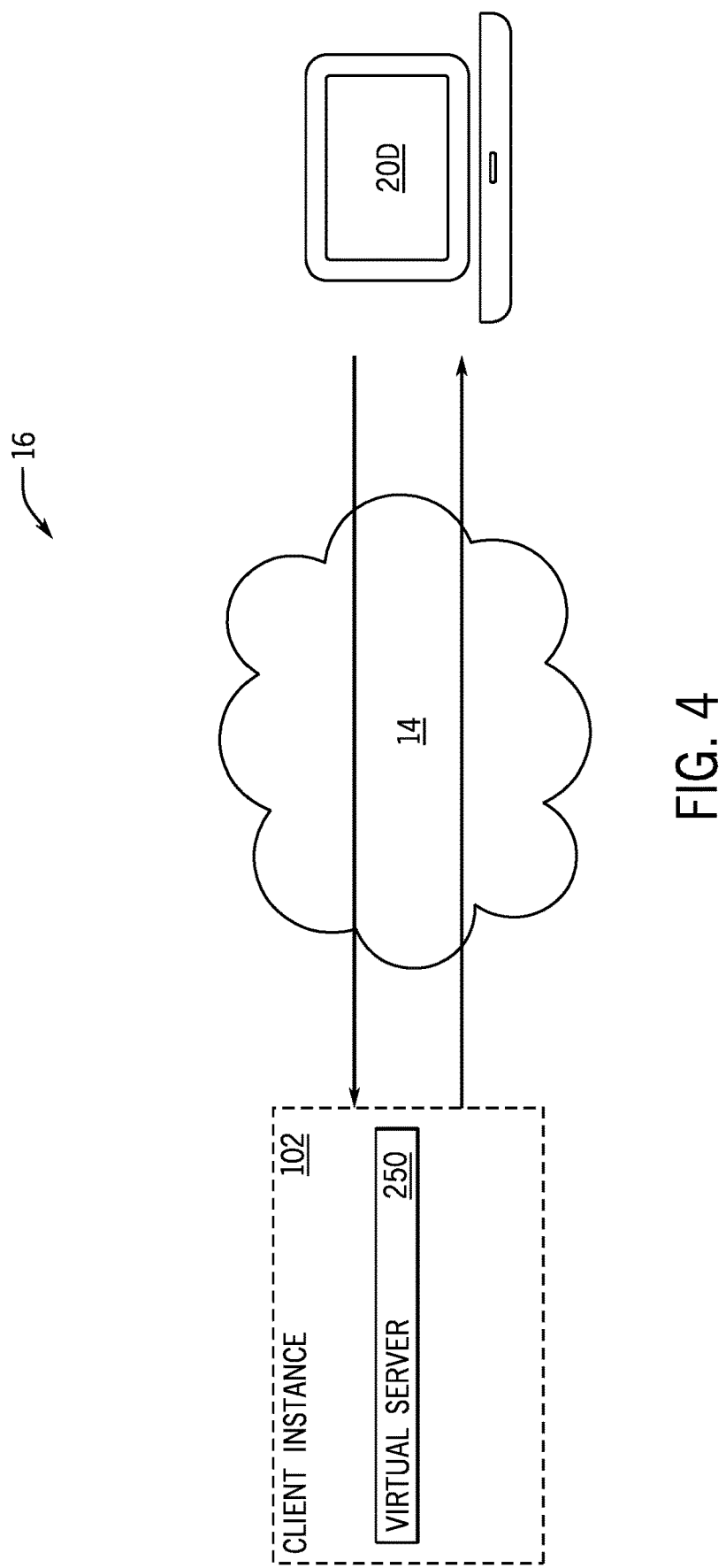
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

An enterprise may implement the cloud-based platform 16 to more efficiently run its operations. For example, each employee and/or contractor may be assigned one or more client devices 20, which may be connected to the network 14, from which they may perform their assigned tasks and duties. For larger networks 14 (e.g., implemented by enterprises with a large number of employees), the enterprise may operate a service catalog by which employees may request hardware, software, services, etc. (e.g., a computer, a smart phone, a tablet, a particular software package, email setup, virtual private network ("VPN") access setup, etc.). The service catalog may be accessible by a web browser or an application running on a client instance 102 and/or the client device 20 via the network 14. The service catalog may list hardware, software, services, and various other things as items within the service catalog.

The service catalog may be configured by the enterprise to recommend products to a user based on what is known about the user and the position they hold. For example, based on the position held by the user (e.g., developer, graphic designer, project manager, data analyst, etc.), the enterprise may know how the piece of equipment is likely to be used (e.g., whether the user is likely to utilize a computer capable of performing more processing intensive tasks, or whether the user travels frequently and is more likely to prefer a smaller computer). Further, the enterprise may configure the service catalog to emphasize certain preferred products or services (e.g., products and/or services that are highly reviewed, products and/or services for which the enterprise receives a discount, etc.). The enterprise may further set up workflows underlying the service catalog to streamline fulfillment, procurement, delivery, installation, etc. Within the service catalog, a user may select an item to view the item's page within the service catalog. The item's page may include one or more variables, which the user may set (e.g., via drop-down menu, entering alphanumeric characters, etc.) to configure the item. The user may then order the item.

Figure 5:
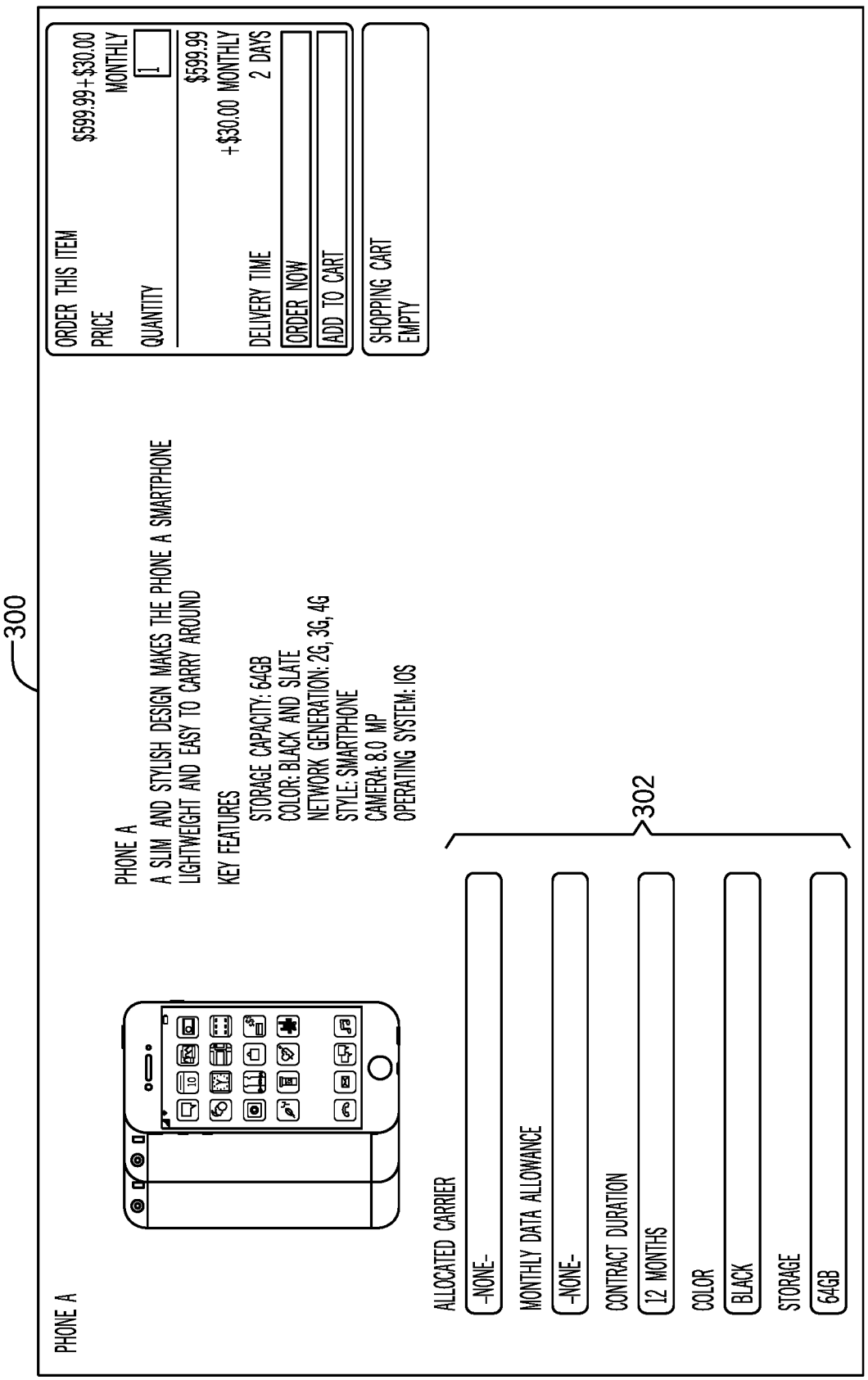
FIG. 5 is a sample screenshot of a service catalog listing for a mobile phone, in accordance with aspects of the present disclosure.

The service catalog may be provided to the enterprise and at least partially operated by a service provider, such as a managed service provider (MSP). The enterprise may then modify the service catalog (e.g., adding and/or removing the products/services offered) as it wishes to customize the service catalog to its particular implementation of the service catalog. Accordingly, the given service provider may provide service catalogs to a plurality of enterprises. FIG. 5 is a sample screenshot 300 of a service catalog listing for a mobile phone. However, it should be understood that the mobile phone shown in FIG. 5 is merely an example and that many other products or services may be listed in the service catalog. As shown, the sample screenshot includes multiple variables 302 (i.e., allocated carrier, monthly data allowance, contract duration, color, and storage), which the user may utilize to further customize the product/service or specific which product/service he or she would like to request.

Figure 6:
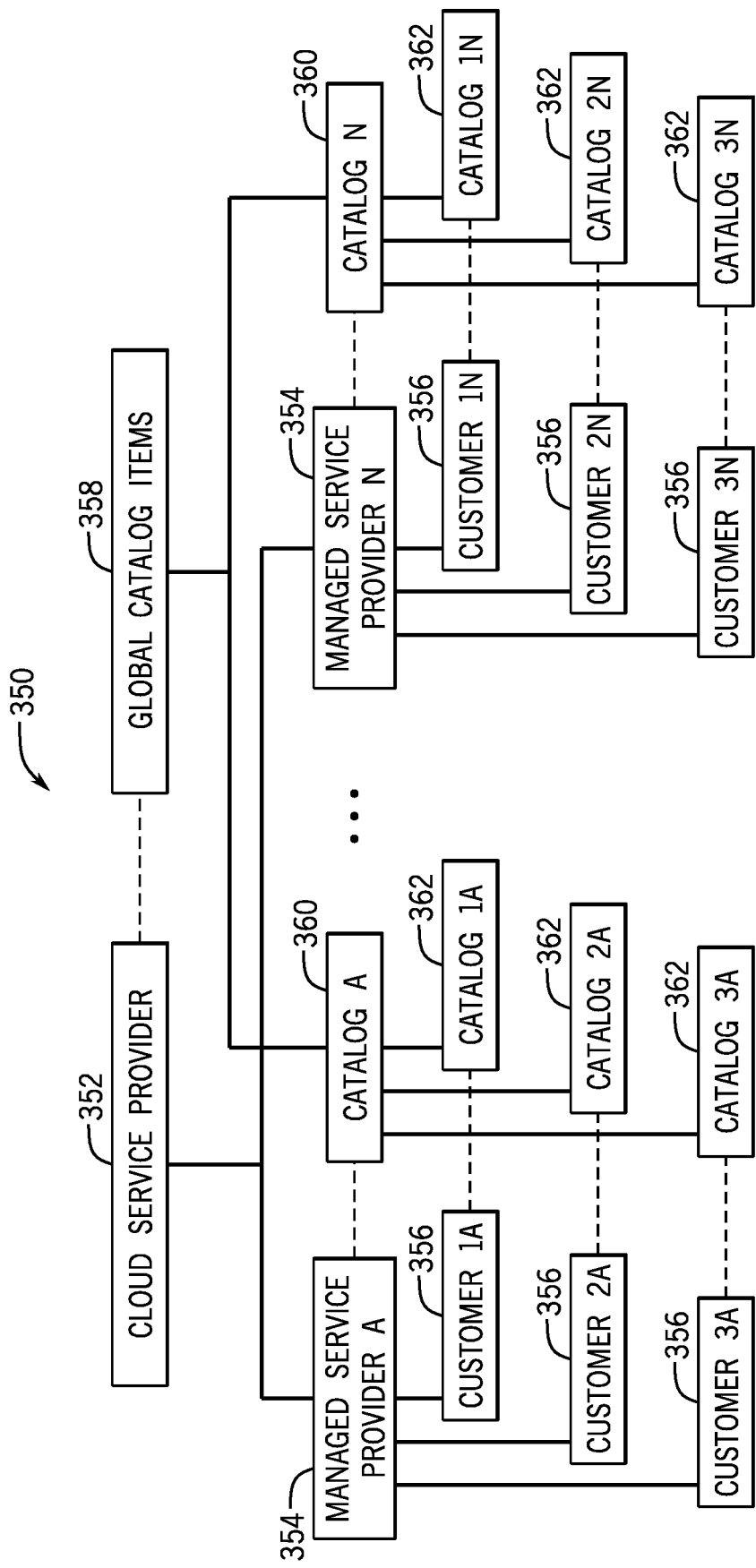
FIG. 6 is illustrates an architecture of domain paths stored in one or more catalog tables for providing the service catalog, in accordance with aspects of the present disclosure.

Data associated with a catalog item may be stored in one or more database tables (e.g., a catalog item data table). For example, the table for storing item data may include fields for domain, manufacturer, part number, vendor, size, color, price, unit cost, configuration, quantity in stock, location of inventory, images or links to images, product description, specifications, reviews, other compatible catalog items, etc. FIG. 6 illustrates an architecture of domains utilized by a domain-separated service catalog. Specifically, the hierarchy of domains shown in FIG. 6 may be used to determine a domain path to be stored in the domain field of a catalog item table. As shown, a cloud service provider 352 provides cloud services to one or more managed service providers (MSPs) 354, which then lease their cloud services to one or more customers 356. However, it should be understood that the architecture shown in FIG. 6 is just an example and that in some embodiments, customers 356 may purchase or lease cloud services directly from the cloud service provider 352. Additionally, or alternatively, in some embodiments, there may be multiple levels of managed service providers 354 between the cloud service provider 352 and the customer 356. Further, in some embodiments, a customer 356 may have multiple catalogs, or even a hierarchy of catalogs corresponding to respective regions, divisions, business units, organizational levels, etc.

The cloud service provider defines global catalog items, associated with a global domain 358. Data defining the global catalog items may then be stored in a catalog item data table. The catalog item data table includes a domain field, by which a respective catalog item is associated with a domain. For example, for a catalog item associated with the global domain, the domain field of the catalog item table may list the global domain. Except in specific circumstances, which will be described in more detail below, the global catalog items are visible to all MSPs 354 and customers 356 that use cloud services offered by the cloud service provider. Each MSP 354 and customer 356 may be provided with one or more domains, each having its own catalog items that are only available within their respective domains. As shown, an MSP 354 may populate the catalog item data table with catalog items associated with a domain 360 assigned to the MSP 354. Similarly, a customer 356 may populate the catalog item table with catalog items associated with a domain 362 assigned to the customer 356.

When someone associated with a domain (e.g., someone associated with the MSP 354 or the customer 356) opens the catalog, the catalog is populated with items from the global records of the catalog items table and the records in the catalog items table that match the domain of the user. Specifically, data is retrieved from the catalog items table based on the value of the domain field such that records listing the global domain in the domain field and records listing the domain associated with the user in the domain field are retrieved and the catalog is populated to display both the global catalog items and the catalog items that are specific to the domain. The catalog items may be segregated into global catalog items and domain-specific catalog items. However, in other embodiments, the global catalog items and the domain-specific catalog items may be interspersed such that the distinction between the global catalog items and the domain-specific catalog items is not apparent to a user.

As discussed in more detail below, when a user associated with a specific domain opens the catalog, data is retrieved for the global catalog items/services as well as the catalog items/services associated with the specific domain. The catalog graphical user interface (e.g., application, web browser, etc.) is then populated with the various available catalog items/services. The user may then select various items/services, view pages for selected items/services, add items/services to a cart and then choose to order the items/services.

Figure 7:
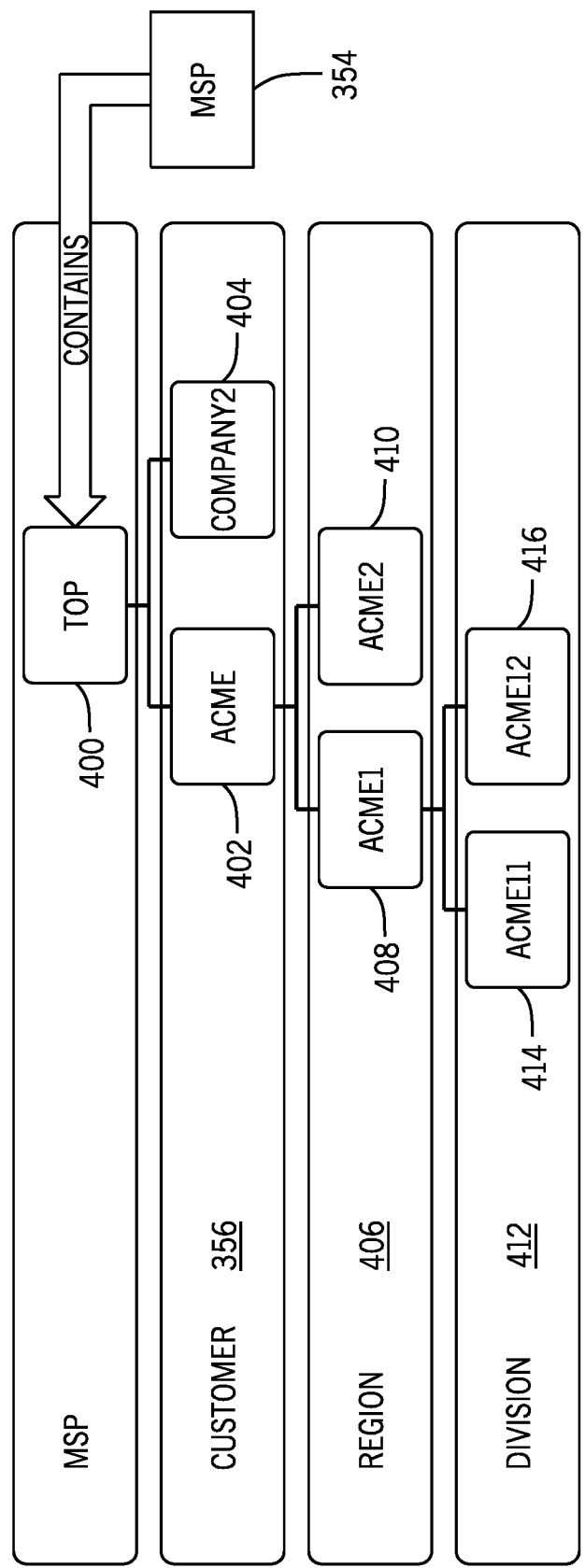
FIG. 7 illustrates an architecture of hierarchical domains for cloud services provided by an MSP to one or more customers, in accordance with aspects of the present disclosure.

FIG. 7 illustrates an architecture of hierarchical domains for cloud services provided by an MSP 354 to one or more customers 356. As previously described, the MSP 354 may purchase or lease cloud services (e.g., cloud storage, cloud processing, etc.) from a cloud service provider. The MSP 354 may then sublease cloud services to one or more customers 356. As shown, a top domain 400 is associated with the MSP 354. The customers 356 to which the MSP 354 provides cloud services may have their own respective domains. For example, FIG. 7 shows a first customer domain 402 associated with a first customer (i.e., "ACME") and a second customer domain 404 associated with a second customer (i.e., "company 2"). As shown, one or more of the customers 356 of the MSP 354 may set up additional domains (e.g., for regions, divisions, etc.). For example, in FIG. 7, the customer 356 ACME has set up a region level 406 of domains that includes a first regional domain 408 ("ACME1") and a second regional domain 410 ("ACME2"). Further, the customer 356 ACME has set up a division level 412 of domains below the regional level 406 of domains, within the first regional domain 408 ("ACME1") that includes a first divisional domain 414 ("ACME11") and a second divisional domain 416 ("ACME12"). Accordingly, the customer domains 402, 404 may be children of the top domain 400; the regional domains 408, 410 may be children of the first customer domain 402 and grandchildren of the top domain 400; and the divisional domains 414, 416 may be children of the first regional domain 408, grandchildren of the first customer domain 402, and great grandchildren of the top domain 400.

Figure 8:
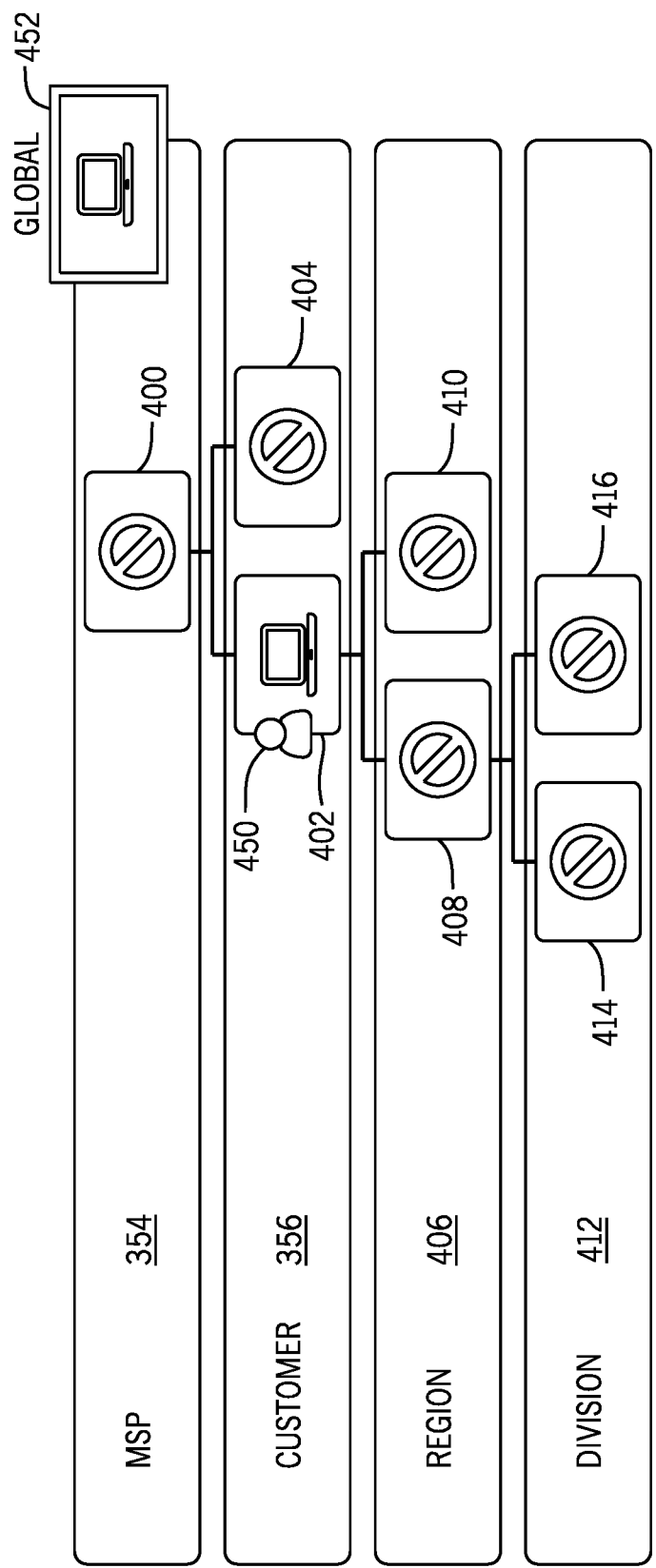
FIG. 8 illustrates access for a user associated with a first customer domain, in accordance with aspects of the present disclosure.

FIG. 8 illustrates access for a user 450 associated with the first customer domain 402. As shown, the user may access catalog items/services associated with the first customer domain 402 and a global domain 452, but not catalog items/services associated with the other domains 400, 404, 408, 410, 414, 416. As previously described, if user criteria are being used within the global domain to control which users have access to which catalog items/services, the user 450 may only see catalog items/services within the global domain 452 for which the user 450 satisfies the user criteria. In the instant embodiment, catalog items/services within a domain may only be accessible to users within the domain. In such an embodiment, data (e.g., data associated with catalog items) may only be accessible within the immediate domain with which the data is associated. However, processes (e.g., workflows) may be configured to flow downward to child domains.

Figure 9:
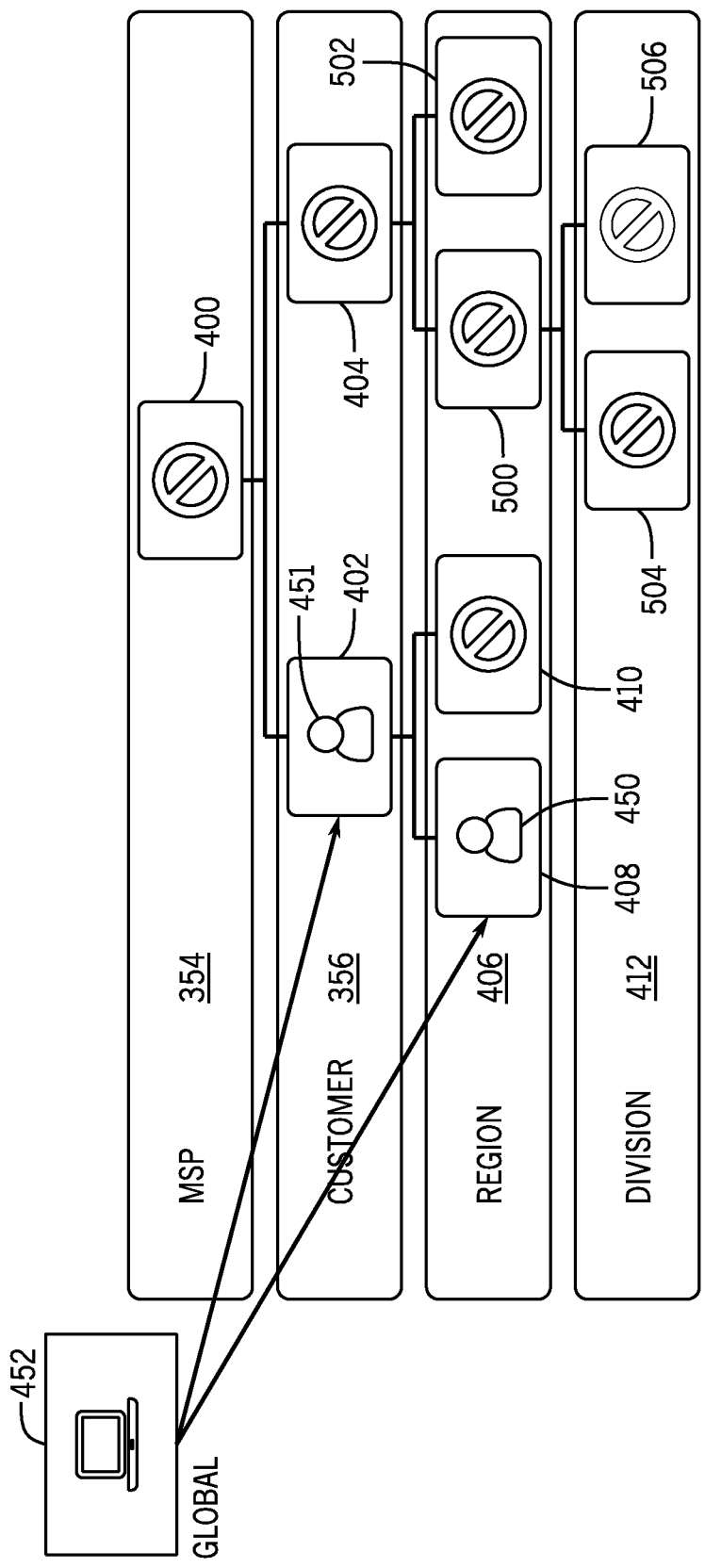
FIG. 9 illustrates access for a catalog item visible by users in different domains via user criteria in an alternative arrangement, in accordance with aspects of the present disclosure.

As a default setting, global catalog items will be viewable and accessible to all users of the catalog. However, each catalog item may include user criteria that can be customized such that the item is only accessible to users who meet the user criteria. FIG. 9 illustrates using user criteria to restrict access to a catalog item 452 to specific users 450, 451 within first and second domains 402, 408. If a catalog item or service is to be accessible by multiple users 450, 451 who do not fall within a single domain (e.g., domains 402, 408), and/or only a subset of users associated with a domain, using user criteria offers an alternative way to make a catalog item or service to the desired users. As such, the catalog items may not be accessible to other users within the domains displayed 400, 402, 404, 406, 408, 410, 500, 502, 504, 506. However, using user criteria to control catalog item accessibility may be more labor intensive and more prone to human error than domain separation. Accordingly, it should be understood that user criteria and domain separation to control catalog item accessibility may each have their own strengths and weaknesses, resulting in tradeoffs that may make user criteria preferable in some situations and domain separation preferable in other situations.

In some embodiments, the user 450 may have access to one or more domains below the user's domain 408 within the domain architecture. In the illustrated embodiment, for the sake of privacy and/or security, the customer 356 and/or the MSP 354 may wish to configure the domain architecture such that the customer 356 does not have access to the MSP's 354 catalog data and/or such that the MSP 354 does not have access to the customer's 356 data. As previously described, if user criteria are being used within the global domain to control which users have access to which catalog items/services, the user 450 may only see catalog items/services within the global domain 452 for which the user 450 satisfied the user criteria. In the instant embodiment, catalog items/services within a domain may only be accessible to users within the domain.

Figure 10:
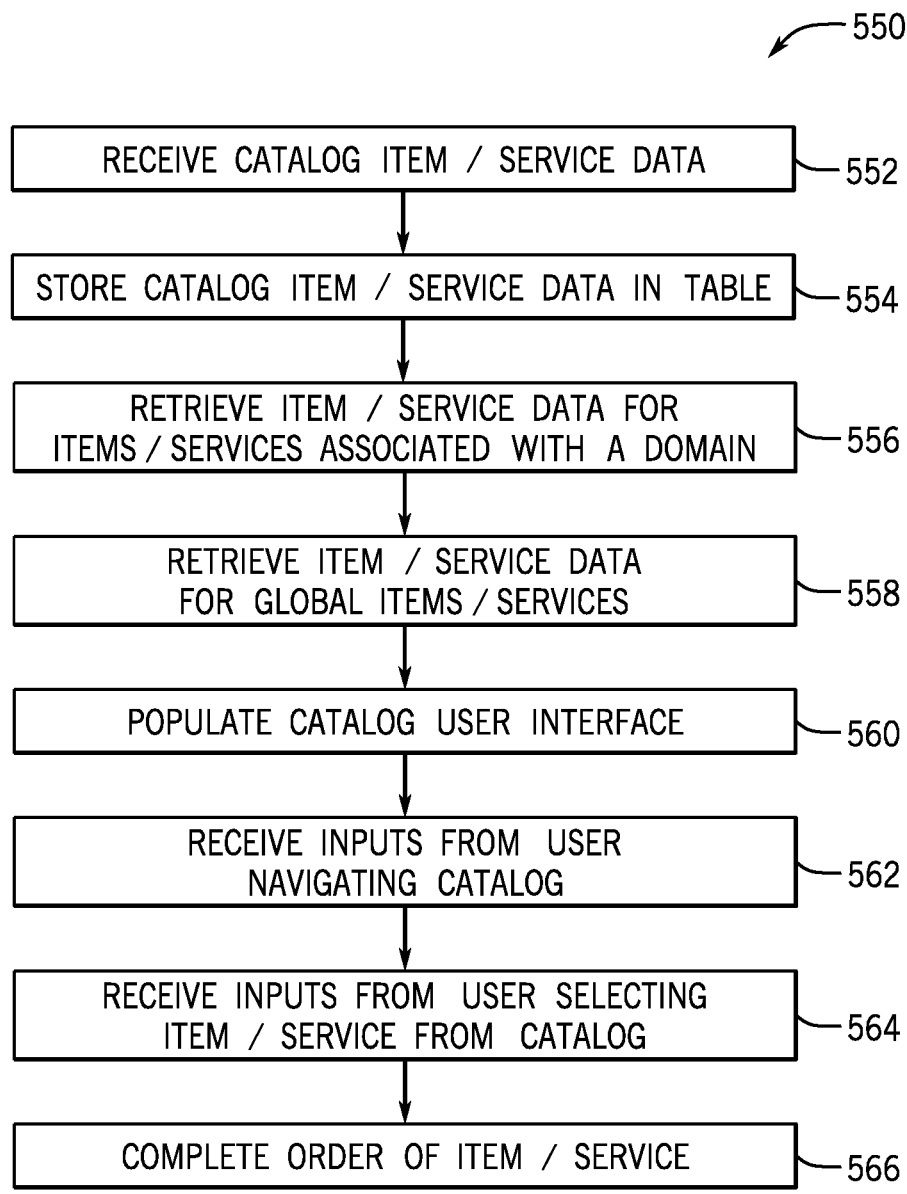
FIG. 10 is a flow chart of a process for configuring, maintaining, and operating the service catalog, in accordance with aspects of the present disclosure.

FIG. 10 is a flow chart of a process 550 for configuring, maintaining, and operating a domain-separated service catalog. At block 552, data associated with a catalog item or service is received. The data may include, for example, manufacturer, part number, vendor, size, color, price, unit cost, configuration, quantity in stock, location of inventory, images or links to images, product description, specifications, reviews, other compatible catalog items, etc. and an indication of the domain with which the item or service is associated. In some embodiments, the data received may be for a new catalog item or service. In other embodiments, the data may be for an existing catalog item or service (e.g., associating the catalog item or service with a new domain). At block 554, the data is stored in the table or tables that store data for catalog items or services associated with the domain.

Upon receiving a request to open the catalog from a user associated with a domain, item/service data for items/services associated with the domain may be retrieved (block 556) and item/service data for global items/services may be retrieved (block 556). At block 560, a catalog user interface may be populated with the global and domain-specific items/services.

At block 562, inputs may be received from a user navigating the catalog and/or selecting items/services within the catalog. At block 564, inputs may be received from a user selecting items/services within the catalog. This may include, for example, adding one or more items/services to a basket or shopping cart. At block 566, the order of one or more items or services is received and/or fulfilled.

The present disclosure relates to a domain separated service catalog. Specifically, catalog items may be defined by catalog item data stored in one or more catalog item tables. Global catalog items may be accessible to all users of a catalog. Accordingly, catalog item data for global catalog items may be stored in global catalog item data tables. Correspondingly, domain separated catalog items may only be accessible within the domain with which they are associated. Catalog item data for domain separated catalog items may be stored in one or more tables, which may be the same or different from the tables in which the global catalog item data is stored. When a user associated with a domain opens the service catalog, data for catalog items may be retrieved from the one or more catalog item tables. The catalog may then be populated with the global catalog items and the domain specific catalog items. A user may then navigate the service catalog, add items/services to a cart, and order items/services. Further, a user may provide inputs defining new catalog items to associate with a domain, or associating an existing catalog item with a new domain.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor; and
a non-transitory memory storing instructions that, when executed by the processor, cause the processor to:
identify a respective domain associated with a particular user wherein the respective domain is identified from a plurality of domains associated with a computing network;
retrieve domain catalog item data for one or more domain separated catalog items associated with the respective domain from a catalog item data table, wherein the one or more domain separated catalog items are only available to one or more users, including the particular user, that are associated with the respective domain identified from the plurality of domains;
retrieve catalog item data for one or more global catalog items from the catalog item data table, wherein the one or more global catalog items are available to users associated with all of the plurality of domains; and
generate a graphical user interface to display the one or more domain separated catalog items and the one or more global catalog items within an online catalog by which products or services are available for order.

2. The system of claim 1, wherein the instructions, when executed by the processor, cause the processor to receive, via the graphical user interface, inputs selecting a catalog item from the one or more domain separated catalog items or the one or more global catalog items.

3. The system of claim 1, wherein the instructions, when executed by the processor, cause the processor to:

receive catalog item data for one of the one or more domain separated catalog items, wherein the catalog item data defines various aspects of the domain separated catalog item; and save the received catalog item data in the catalog item data table.

4. The system of claim 3, wherein the instructions, when executed by the processor, cause the processor to:

receive an input associating the domain separated catalog item with the respective domain; and update the catalog item data table to include the domain separated catalog item.

5. The system of claim 3, wherein the instructions, when executed by the processor, cause the processor to receive a request from the particular user to open the graphical user interface.

6. The system of claim 1, wherein the respective domain is associated with a customer of a managed service provider (MSP).

7. The system of claim 6, wherein the customer is associated with a plurality of domains, including the respective domain.

8. A method, comprising:

receiving a request from a particular user to open an online catalog by which products or services are available for order;

identifying a respective domain associated with the particular user, wherein the respective domain is identified from a plurality of domains associated with a computing network;

retrieving domain catalog item data for one or more domain separated catalog items associated with the respective domain from a catalog item data table wherein the one or more domain separated catalog items are only available to one or more users, including the particular user, that are associated with the respective domain identified from the plurality of domains;

retrieving catalog item data for one or more global catalog items from the catalog item data table, wherein the one or more global catalog items are available to users associated with all of the plurality of domains; and generating a graphical user interface to display the one or more domain separated catalog items and the one or more global catalog items within the online catalog.

9. The method of claim 8, comprising receiving, via the graphical user interface, inputs selecting a catalog item from the one or more domain separated catalog items or the one or more global catalog items.

10. The method of claim 9, comprising fulfilling an order for the selected catalog item.

11. The method of claim 8, comprising:

receiving catalog item data for one of the one or more domain separated catalog items, wherein the catalog item data defines various aspects of the domain separated catalog item; and saving the received catalog item data in the catalog item data table.

12. The method of claim 11, comprising:

receiving an input associating the domain separated catalog item with the respective domain; and updating the catalog item data table to include the domain separated catalog item.

13. The method of claim 8, wherein the respective domain is associated with a customer of a managed service provider (MSP).

14. The method of claim 13, wherein the customer is associated with a plurality of domains, including the respective domain.

15. A non-transitory, tangible, computer readable medium comprising instructions that, when executed by a processor, causes the processor to:

identify a respective domain associated with a particular user, wherein the respective domain is identified from a plurality of domains associated with a computing network;

retrieve domain catalog item data for one or more domain separated catalog items associated with the respective domain from a catalog item data table, wherein the one or more domain separated catalog items are only available to one or more users, including the particular user, that are associated with the respective domain identified from the plurality of domains;

retrieve catalog item data for one or more global catalog items from the catalog item data table, wherein the one or more global catalog items are available to users associated with all of the plurality of domains;

generate a graphical user interface to display the one or more domain separated catalog items and the one or more global catalog items within an online catalog by which products or services are available for order; and receive, via the graphical user interface, inputs selecting a catalog item from the one or more domain separated catalog items or the one or more global catalog items within the online catalog by which products or services are available for order.

16. The non-transitory, tangible, computer readable medium of claim 15, wherein the instructions, when executed by the processor, causes the processor to receive a request from the particular user to open the graphical user interface.

17. The non-transitory, tangible, computer readable medium of claim 15, wherein the instructions, when executed by the processor, causes the processor to:

receive catalog item data for one of the one or more domain separated catalog items, wherein the catalog item data defines various aspects of the domain separated catalog item; and save the received catalog item data in the catalog item data table.

18. The non-transitory, tangible, computer readable medium of claim 17, wherein the instructions, when executed by the processor, causes the processor to:

receive an input associating the domain separated catalog item with the respective domain; and update the catalog item data table to include the domain separated catalog item.

19. The non-transitory, tangible, computer readable medium of claim 15, wherein the respective domain is associated with a customer of a managed service provider (MSP).

20. The non-transitory, tangible, computer readable medium of claim 19 wherein the customer is associated with a plurality of domains, including the respective domain.

* * * * *